UNITED STATES PATENT OFFICE.

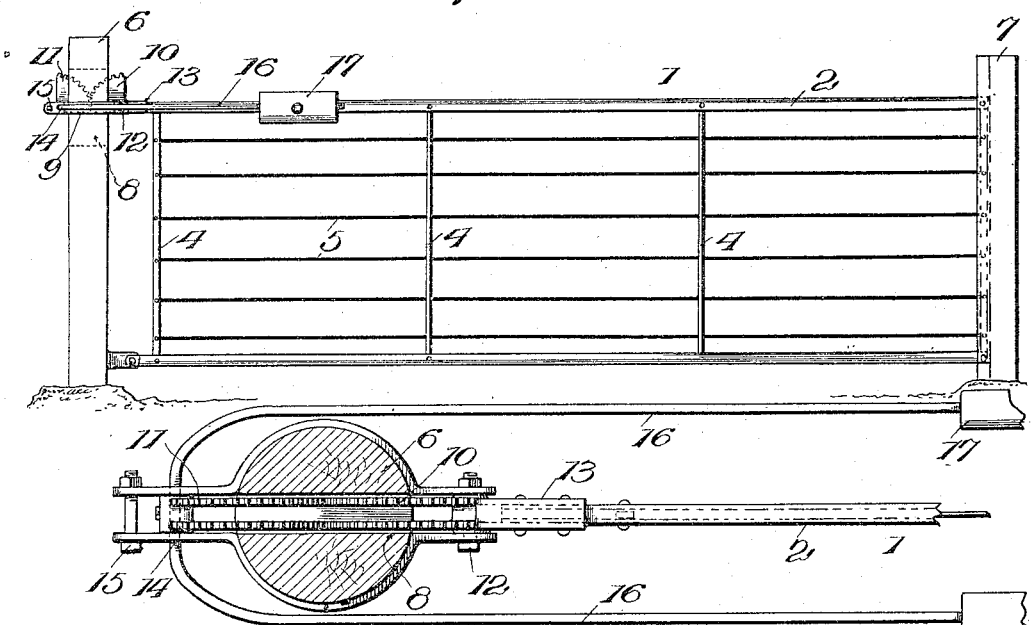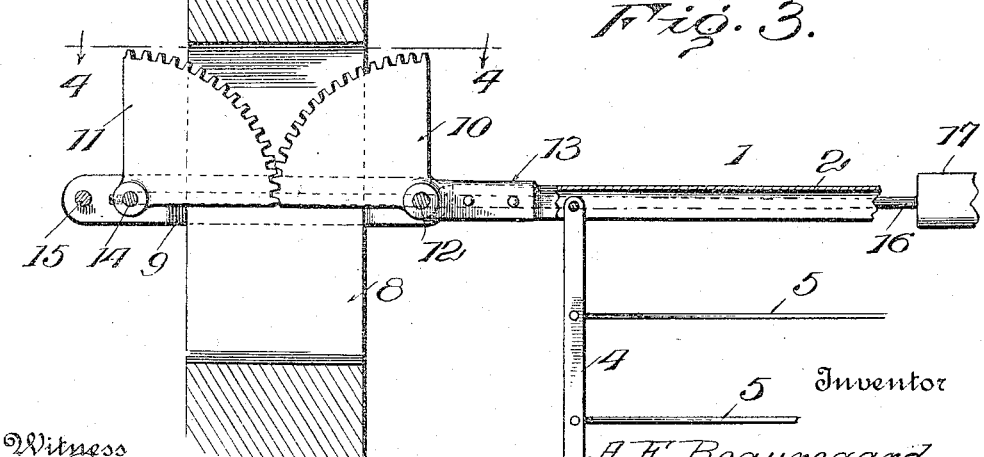

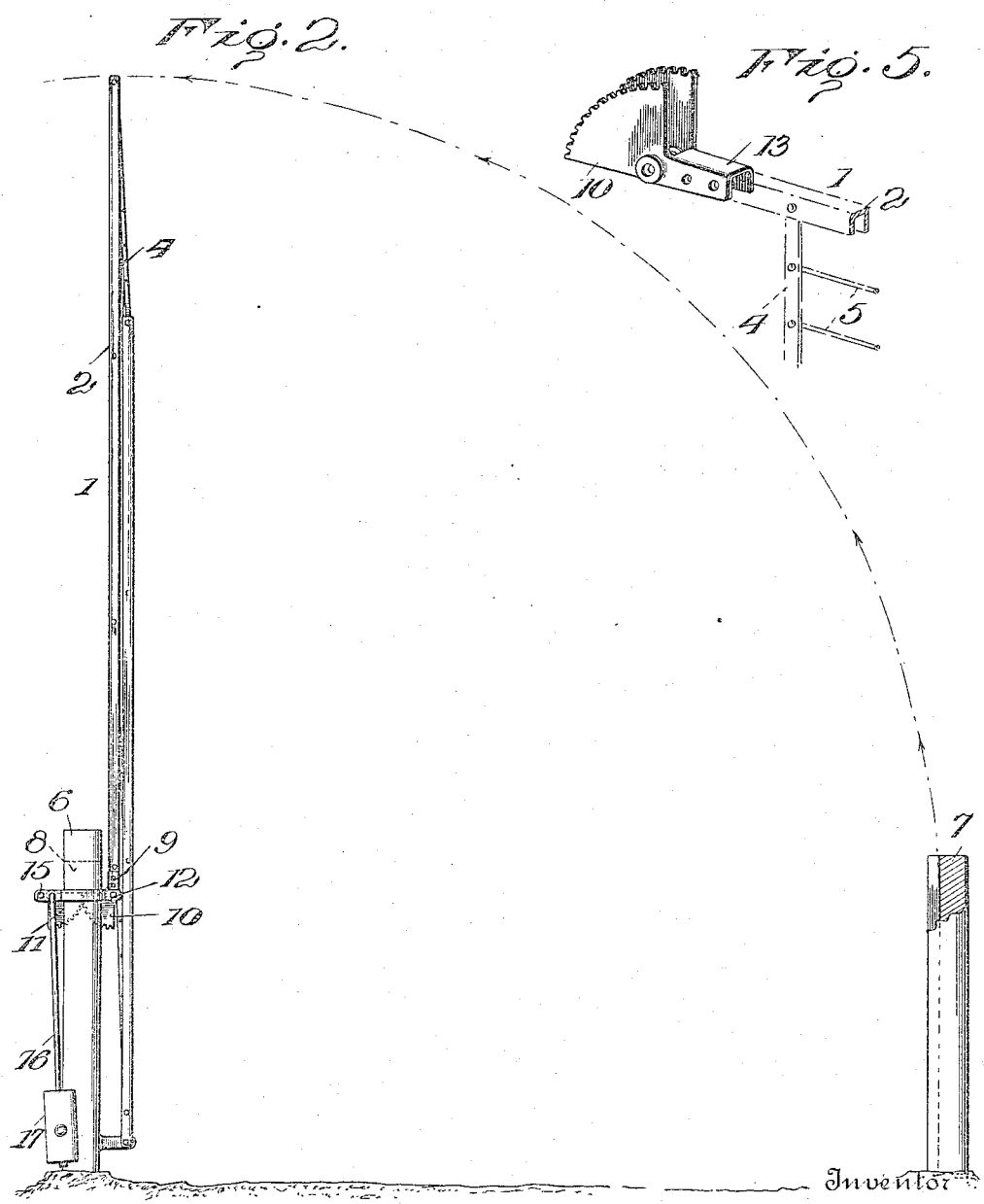

ALBERT FRANK BEAUREGARD, OF WEST DE PERE, WISCONSIN.

GATE.

1,212,439.

Specification of Letters Patent.    Patented Jan. 16, 1917.

Application filed September 1, 1916.   Serial No. 118,062.

*To all whom it may concern:*

Be it known that I, ALBERT F. BEAUREGARD, a citizen of the United States, residing at West De Pere, in the county of Brown and State of Wisconsin, have invented certain new and useful Improvements in Gates; and I do declare the following to be a full, clear, and exact description of the invention, such as will enable others skilled in the art to which it appertains to make and use the same.

My invention which relates to improvements in gates of the vertically swinging type, has for its object to provide a simple yet strong and efficient arrangement of parts for raising the gate and holding it in an elevated position.

With this general object in view, the invention resides in certain novel features of construction and in unique combinations of parts to be hereinafter fully described and claimed, the descriptive matter being supplemented by the accompanying drawings which constitute a part of this application and in which:

Figure 1 is a side elevation of the gate in closed position; Fig. 2 is a similar view showing the gate opened; Fig. 3 is an enlarged vertical section through part of the gate and the post upon which it is mounted, showing the gate raising means in elevation; Fig. 4 is a horizontal section on the plane of the line 4—4 of Fig. 3. Fig. 5 is a detail perspective view of one of the gear segments and adjacent parts.

In specifically describing the structure shown in the drawings above briefly described, similar characters will be employed to designate corresponding parts throughout the several views and reference will be herein made to the numerous elements by their respective indices. To this end, the numeral 1 designates the gate which consists of upper and lower channel iron bars 2 and 3, upright bars 4 pivoted at their ends to said bars 2 and 3, and longitudinal rods or wires 5 connected with the end bars of the gate in such a manner as to permit all parts of said gate to move parallelogrammatically.

At the ends of the gate 1 gate posts 6 and 7 are disposed, the latter having any preferred means for holding the free end of the gate in lowered position. The post 6 has formed through its upper end a slot 8 and extending around said end are two metal bars or straps 9. The opposite ends of the bars 9 project beyond the posts 6 and intermeshing gear segments 10 and 11 are disposed between said ends. The segment 10 is mounted on a bolt 12 and is provided with an integral channel-shaped attaching arm 13 which receives and is rigidly bolted to the upper bar 2 of the gate 1. The segment 11 is secured on the center of a transverse rock shaft 14 mounted in bearing openings formed in one end of the bars 9, these bars being connected adjacent said shaft by a bolt 15 which coöperates with the bolt 12 in clamping the two bars or straps 9 rigidly around the post.

Extending laterally from the opposite ends of the shaft 14 and disposed on opposite sides of the gate 1 are two crank arms 16 which are preferably formed by bending the ends of said shaft as shown. The free ends of the arms 16 are provided with weights 17 which are sufficiently heavy to depress said arms to raise the gate 1 when the latch means connecting said gate with the post 7 is released, said gate then moving to the folded position depicted in Fig. 2.

By the construction shown and described, the device will be simple, inexpensive and efficient, particular emphasis being laid upon the fact that the arms 16 operate adjacent the gate and do not therefore interfere in any way with the fence secured to the post 6. Furthermore, by providing the two arms 16, the weights 17 need not be of such size as to be cumbersome as would be necessary if but one arm were provided.

On account of the features above pointed out, the construction shown and described constitutes the preferred form of the gate but it is to be understood that within the scope of the invention as claimed, numerous changes may be made without sacrificing the principal advantages thereof.

I claim:

1. The combination with a post and a gate, of a gear segment mounted rockably on the post and rigidly secured to said gate, a second segment mounted rockably on the post and meshing with the other, an arm secured rigidly to said second segment and extending therefrom along one side of the gate, and a weight on said arm for operating the segments to raise the gate.

2. The combination with a post and a gate, of a gear segment mounted rockably on the post and rigidly secured to said gate, a second segment mounted on the post and meshing with the other, a rock shaft on which said second segment is secured, a pair of crank arms extending rigidly from the ends of said shaft and extending along opposite sides of the gate, and weights on said arms for operating the segments to raise the gate.

3. The combination with a post and a gate, said post having a slot formed through its upper end, of a pair of intermeshing gear segments mounted partially in said slot, one of said segments being rigidly secured to the gate, a pair of straps contacting with opposite sides of the post and projecting at their ends beyond said post, a bolt passing through one end of said straps and serving as a pivotal mounting for the segment secured to the gate, an additional bolt passing through the other ends of said straps and coöperating with the other bolt in retaining said straps in position on the post, a rock shaft on which the other segment is mounted, said shaft being supported rotatably by the aforesaid straps, and one or more weighted crank arms extending from said rock shaft into parallel relation with the gate.

In testimony whereof I have hereunto set my hand in the presence of two subscribing witnesses.

ALBERT FRANK BEAUREGARD.

Witnesses:
FLORENCE ALBERS,
C. V. LOPER.

Copies of this patent may be obtained for five cents each, by addressing the "Commissioner of Patents, Washington, D. C."